United States Patent [19]
Alstrøm et al.

[11] Patent Number: 5,857,177
[45] Date of Patent: Jan. 5, 1999

[54] NEURAL NETWORK

[76] Inventors: Preben Alstrøm, Hollaenderdybet 7, st. tv., DK-1855 Frederiksberg, Denmark; Dimitris Elias Stassinopoulos, 6930 Palmetto Cir., South S., App. No. 206, Boca Raton, Fla. 33433

[21] Appl. No.: 700,386

[22] PCT Filed: Mar. 8, 1995

[86] PCT No.: PCT/DK95/00105

§ 371 Date: Nov. 5, 1996

§ 102(e) Date: Nov. 5, 1996

[87] PCT Pub. No.: WO95/24684

PCT Pub. Date: Sep. 14, 1995

[30] Foreign Application Priority Data

Mar. 8, 1994 [DK] Denmark .................. 0268/94

[51] Int. Cl.⁶ .................................................. G06F 15/18
[52] U.S. Cl. ................................................. 706/15; 706/43
[58] Field of Search ............... 395/20–25; 382/155–161; 706/15, 41, 27, 34, 43, 16, 25

[56] References Cited

U.S. PATENT DOCUMENTS

| | | | |
|---|---|---|---|
| 4,774,677 | 9/1988 | Buckley | 364/513 |
| 4,926,064 | 5/1990 | Tapang | 395/24 |
| 4,933,871 | 6/1990 | DeSieno | 364/513 |
| 5,274,745 | 12/1993 | Takashi | 395/24 |
| 5,283,855 | 2/1994 | Motomura et al. | 395/23 |

OTHER PUBLICATIONS

Melso et al, "A neural network solution for call routing with preferential call placement," Globecom '90, pp. 1377–1381 vol. 2, Dec. 1990.

Matsumoto et al., "A high–speed learning method for analog neural networks," IJCNN, pp. 71–76 vol. 2, Jun. 1990.

Moon et al, "An improved neural processing element using pulse coded weights," 1993 IEEE International Symposium on Circuits and Systems, pp. 2760–2763 vol. 3, May 1993.

Miyajima et al, "performances of decision feedback equalizers using neural networks under frequency selective fading channels," Communications on the move, ICCS/ISITA '92, pp. 374–378 vol. 1, Nov. 1992.

*Primary Examiner*—Robert W. Downs
*Assistant Examiner*—Sanjiv Shah
*Attorney, Agent, or Firm*—Ladas & Parry

[57] ABSTRACT

A neural network has a plurality of network neurons and a plurality of network connections which connect each network neuron to one or more other network neurons. Each network neuron has control parameters in the form of an associated threshold value and/or signal distribution when a signal is supplied to other network neurons, and supplies a signal to the output in response to a comparison between said threshold value and a signal received on the input. One or more network neurons serve as network inputs, which supply an output representation in dependence on the sensed parameters applied to the network input. The network has associated with it sensor neurons which register changes in the conditions under which the network works, and the control parameters of the network neurons are regulated in dependence on this.

16 Claims, 8 Drawing Sheets

NEURAL NETWORK

The invention concerns a neural network of the type stated in the introductory portion of claim 1.

Neural networks are used for data processing purposes on the basis of a plurality of complexely related input parameters to give the best possible response thereto without necessarily knowing the relation between the individual input parameters. This is extremely advantageous when no such linear relation exists.

The starting point of neural networks is the ability of the human brain to identify the most important parameters in a decision-making process and to draw correct conclusions by experience. Neural networks are therefore constructed according to the same basic principles as the human brain, comprising a multitude of decision-making cells or neurons as well as connections or synapses between these.

In order to make the best possible decisions artificial neural networks therefore go through a comprehensive learning procedure before they are used in practice, and the experience thus acquired is utilized for adjusting the control parameters for the neurons and the synapses.

As far as the neurons are concerned, these control parameters comprise a threshold value which determines whether the neuron concerned fires or applies an electric pulse after having received corresponding pulses from other neurons. The fired pulses are transferred via one or more synapses to other neurons, and the strength or the amplitude of the individual pulses transferred is one of the adjustable control parameters in the network.

A plurality of learning approaches is known, by means of which the parameters can be established according to given applications, which takes place prior to putting the network into service.

These include e.g. EP-A-492 641, which discloses a neural network and a learning procedure for it. The learning procedure comprises submitting to the network an input data signal and a learning signal containing both desired and undesired data. Hereby the network will subsequently respond more expediently. If, e.g., the network controls a process system, it would be fatal if the network would e.g. cause an increase in temperature owing to specific input data which would in turn result in an increase in pressure, if the pressure was then above the value which the system could stand.

U.S. Pat. No. 5,107,454 discloses a neural network for use in pattern recognition, and this network is based on feedback, since the learning procedure is iterative, which means that the pattern concerned and the subsequent intermediate result patterns are run through the network.

EP-A-405 174 discloses a learning method which ensures that the network does not "drop" in a local maximum, which might happen if the correlation between input and output data in a region was of a certain size. The data processing system could thus not get out of these conditions, and further adaptation would not be possible.

U.S. Pat. No. 5,010,512 discloses implementation of a neural network as MOSFET transistor elements. The neurons may here be regarded as being threshold switches having several inputs. The network can be operated in two modes, a learning mode in which the control parameters of the neurons are adjusted, and an associative mode in which the control parameters are constant.

U.S. Pat. No. 4,933,871 discloses an adaptive neural network which is adapted to receive input signals from an external system. The network may be adjusted on the basis of an external signal generated by the external system in that some weight factors and thus the transfer function of the network are changed.

It may be said about prior art neural networks that following completed learning procedure they respond in the same manner to the same data sets, notwithstanding the surrounding in which the network controls a process, traffic or the like, change.

Accordingly, the object of the invention is to provide a new generation of neural networks which possess greater adaptability, and where the network is currently capable of adapting to new conditions as well as new or changed surroundings.

The object of the invention is achieved in that the number of firings from a network region, preferably the output region, determines the size of the threshold values so that, if the number of firings exceeds a certain value, the threshold value signal is increased, and if the number of firings is below the value, the threshold value signal is reduced, which number of firings from a network region also determines the size of the strength signal which is responsive to a signal applied to the network from an external system.

This provides a neural network which, without being set to a specific task in advance, currently adapts itself. This also takes place in the performance of a task.

The network of the invention can thus be used in tasks where the possible results are not known, or where they are difficult to define, and the network can currently adapt itself to variations in the task as well as changes in the desired goals. While prior art neural networks are normally adapted to a given task, it may said that the network of the invention automatically adapts itself, the modes of the network units and the strengths of the compounds between these being currently updated during the execution of a task.

While prior art may be said to work with a learning mode and an associative memory mode, respectively, the network of the invention may be said to be in a performing mode, since the network continues its learning during the execution of a task. Even though no external feedback to a network according to the invention takes place, it will still possess advantages over prior art neural networks because of a local reinforcement rule and a simple evaluative feedback in the learning.

The network units are preferably constructed in layers, and all the network units in a layer receive signals from network units in the preceding layer and emit signals to network units in the subsequent layer. It is hereby ensured that a direct signal transfer path is established in the network without any risk of loops being formed internally in the network.

The signals which the network units emit to each other via the network connections are formed by short pulses, and the pulse height is one of the parameters that can be controlled when the surroundings of the network change dynamically. When the network of the invention is implemented electronically, the pulse height regulation will normally be incorporated in the network connections or the synapses. In other words, the network units may be considered as being pulse transmitters, and the pulses propagate through the network in a chain reaction. The time it takes for the pulses to propagate through the network, i.e. from when a parameter is received on the input of the network until it provides a response on the output of the network, may be considered as being the response time of the network.

One of the essential elements in the network of the invention is an internal activity control, e.g. implemented through a self-monitoring threshold value or strength adjustment. The network, which may be called a performing network, differs from other known, artificial networks precisely by this activity control. In a preferred embodiment of the invention, it is attempted to keep down the total number of pulses in the network. This is done by using an internal control mechanism which keeps down the total number of pulses. The total signal from a region which can e.g. be identified with the output region, is detected. If this exceeds the unit signal, i.e. if more than one output unit fires, then the threshold value increases and if the total signal is below the unit signal (no signal), then the threshold value decreases.

If it is the entire firing frequency of the network that is monitored, it is desired that only few neurons in each layer fire. The threshold value can hereby be controlled so that the number of firing neurons approaches a number of the same order as the number of layers. This means that the number of firing neurons will be small with respect to the total number of neurons of the network, but will be sligthly larger than the number of neuron layers in the network. The network will hereby be very sensitive to changes in the dynamic conditions of the external system.

Since the network has a natural response time (transport of signal from input to output), this mechanism gives rise to a complex oscillating activity signal, e.g. represented by the threshold value. It is this property that gives the network its adaptability.

The sensitivity of the network is increased precisely because there is path of firing neurons through the network. If the input or feedback is changed, more new paths will be formed, and when new stationary modes of the external system occur, these new paths will be narrowed again so that there will again be a path through the network. Each output of the network will be associated with a predetermined action in a preferred embodiment. Correspondingly, the inputs of the network will be associated with sensing of corresponding action-specific parameters. This gives an unsurpassed adaptability to the network, since the networks adapts itself to the use concerned. Therefore, the network does not have to be tied to a specific use, it being possible to connect the inputs and the outputs randomly to the external system, since with time the feedback signal optimizes the parameters of the network to the given purpose.

The invention also concerns a method of optimizing a neural network to changed conditions of operation, said method being characterized by the features defined in claim 5.

It should be noted that the threshold value in the preferred embodiment is global, i.e. the same for all network neurons, while the strength of the connections is local.

It will appear from the detailed embodiments that the network of the invention lends itself for adaptation to a given application, without it having been adapted to the given task beforehand. However, the invention is particularly useful for tasks in which the surroundings change their nature. When the network has adapted itself to a given application, it can also adapt itself to changes occurring in that connection. The invention will thus be extremely useful in connection with networks in which learning takes place in a special learning phase, since the network of the invention will still be able to adapt itself to dynamic variations in the external system.

The invention will be explained more fully below in connection with the preferred embodiment and in connection with various examples of applications with reference to the drawing, in which.

Figure 1:
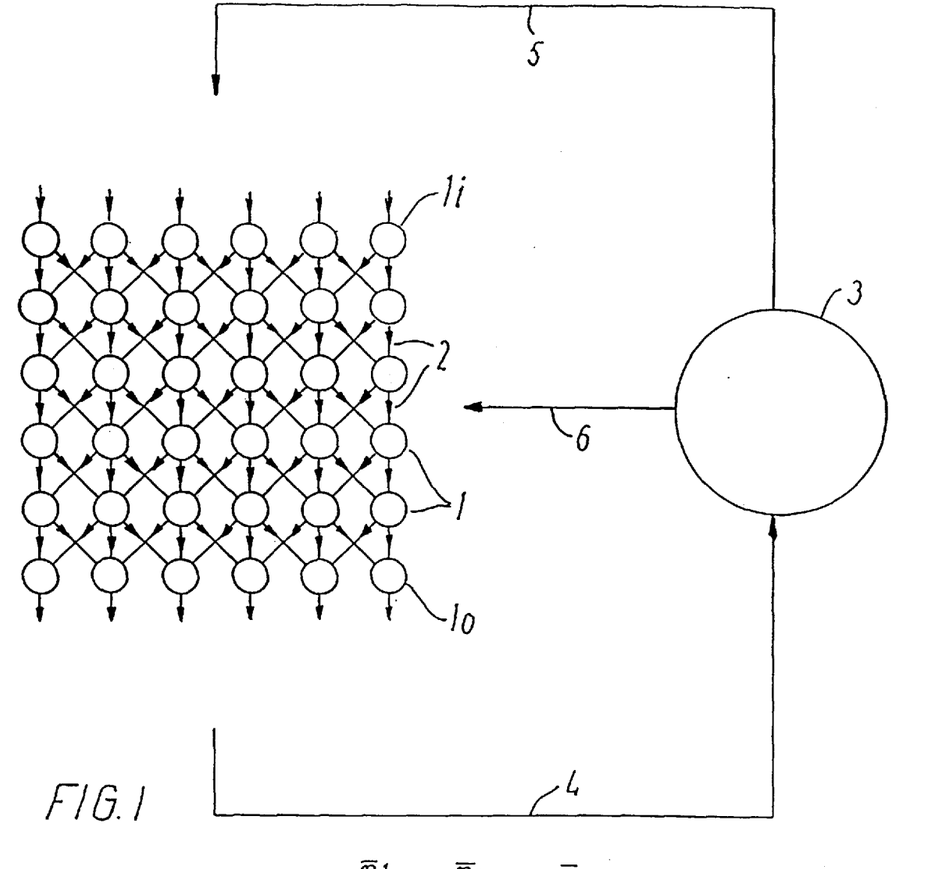
FIG. 1 is a schematic view of a preferred embodiment of a performing network according to the invention.

FIG. 1 shows a preferred embodiment of a neural network according to the invention, and the network, which is of the performance type, will be explained below. It will be seen that the network is constructed as a matrix of network units 1 or neurons, each network unit 1 being connected to one or more other network units 1 through network connections 2 or synapses. In the embodiment shown in FIG. 1, the neural network is layered, the network units 1 in one layer being connected to a plurality of network units 1 in the adjacent layers. Thus, a network unit 1 receives signals or firings from network units 1 in the previous layer and emits signals or firings to network units in the following layer. Neural networks of this type are called feed forward networks. It will be seen that the network has an input layer of network units, and these are designated $1_i$ in the the drawing. These network units $1_i$ are supplied in a manner known per se with an input signal in the form of the parameters to which the network is desirably to respond or react in response to the "experience" which the network has. There is likewise an output layer having network units $1_o$ which supply a response or a representation in dependence on the parameter complex applied to the input layer which is to be evaluated.

It is moreover shown schematically that the network is connected to an external system 3, and this external system may e.g. be a process which is controlled by the network. The network can control many different systems, examples being traffic control, control of foreign exchange transactions, control of meat quality, etc. The network units $1_i$ on the input of the network receive data from the external system via a connection 5. These received data have been processed in advance in a manner known per se, so that data are represented in a correct data format. In dependence on this, the network provides the output with a response to the data applied, and this response is supplied via a connection 4 to the external system. This response will then contain instructions on the manner in which the external system is to be affected to achieve the desired processes. It will additionally be seen that there is a feedback connection 6 from the external system, and this feedback signal affects the mode of operation of the network itself, while ordinary input data transferred via the connection 5 solely affect the decision-making basis for the network. It should be noted here that the feedback signal from the external system contains an evaluation of whether the system control of the network itself is good or bad. To prevent useful information from getting lost among random firings from the network units, it is generally desirable that the firing level is kept as low as possible, typically just a few firings in each network layer. The outputs from the neurons may be coupled to a multiplier so that the signals are added. The output from this may be coupled to a comparator by means of which the amount of the firing may be coupled with a desired threshold value, and the threshold value of the network is adjusted in response to this.

Optimization of the number of firing neurons to a predetermined desired number makes the network very sensitive to changes in the external system. It may be said that the network becomes sensitive to "criticism" from the external system.

A performing network according to the invention has four dynamic elements which vary in terms of time.

The first one of these is the network units comprising both network units contained in the actual neural network and units contained in the input and output layers. The temporal mode variation of the network units corresponds to prior art known per se, since the variation solely depends on the signal applied to the input of the network. The network units are pulse transmitters which fire or emit a pulse, if the received complete signal exceeds a given threshold value T. Thus, the network units may be described by a mode n(t), where n(t) at a given time t may be expressed by: n=0 when no pulse is emitted, and n=1 when a pulse is emitted. To use pulse transmitters as network units is essential according to the invention, but, naturally, it is no innovation per se.

One of the essential elements in a performing network is the activity control, e.g. in the form of the self-monitoring threshold T(t). Here the performing network differs significantly from other artificial neural networks. The threshold value may e.g. be controlled in that the total signal from a plurality of network units in a region, e.g. the output region, is detected and compared with a desired signal, the threshold value being then adjusted in response to this comparison. This may mean that if the total signal exceeds the unit signal, i.e. if more than one output unit fires, then the threshold value increases, and if the total signal is below and there is thus no signal, then the threshold value decreases. This new idea is an internal control mechanism where the total number of pulses is kept down. The network may be composed of transistor logics, which will explained below, and it will therefore have a certain response time, i.e. the time it takes from the application of a signal to the input of the network to the production of a response to this signal. This mechanism will thus cause the threshold value to be complexely oscillating. It is i.a. this property that gives the network its adaptability. It should be mentioned here that the change in the threshold value must be relatively small over a period corresponding to the response time of the network.

The third dynamic element of a performing network is the connection between the individual network units. A connection between two units just permits pulse firing in one direction. A strength q(t) is associated with each of these connections, q being located in the range between 0 and 1. The strength q thus determines the size of a possible pulse which is transmitted through the connection concerned. Each network unit 1 is connected to other pulse transmitters, from which signals are received, through input connections. If the total, received signal exceeds the threshold value concerned, the network unit transmits a pulse which is spread through the output connections, the sum of the strengths of the output connections being precisely one. The strength concept is well-known in connection with artificial neural networks of a known type in which the strength values are updated by pattern learning. It is here desired to strengthen the connections that lead to correct patterns. This frequently takes place globally according to a complicated mathematical set of rules. The strength values are currently updated in performing networks too, and this is done according to a simple local rule. Connections providing a positive feedback will be strengthened according to a performing network according to the invention, while connections providing a negative feedback are correspondingly weakened. This is done according to the invention by currently and locally updating or adjusting the connections where pulses are transmitted sequentially between two units.

The performing network of the invention is connected to a peripherial user-selected system via an input and an output as well as a feedback which is essential to the invention and which may be described with a value r(t). This feedback will either be positive or negative in response to whether the network has performed its task well or badly, and it may therefore be described as being either $r=r_+>0$ for a positive feedback or $r=r_-<0$ for a negative feedback. Greater differentiation may occur.

The feedback signal r(t) will normally not be stepped, since the individual feedbacks will be delta-shaped or in the form of voltage peaks. If the feedback signal occurs periodically, the signal r(t) may have the shape of a periodically jumping function with segments of exponential functions with a negative argument.

Figure 2:
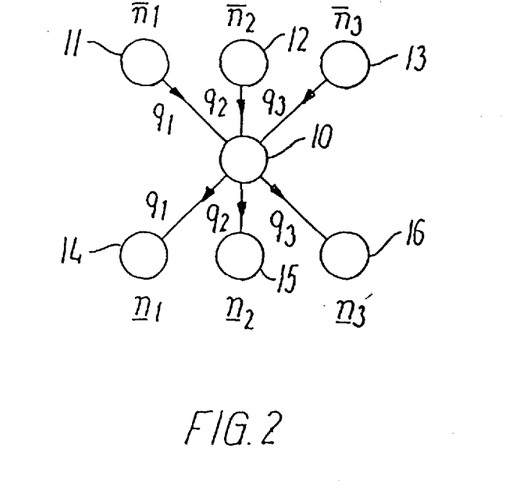
FIG. 2 shows a network unit in one layer and network units in other layers connected therewith.

Referring back to FIG. 1, it will be seen that each network unit in the central part of the network is connected to three other network units in the preceding layer and to three network units in the subsequent layer. This is illustrated in FIG. 2, and it will be seen that a network unit 10 has three input connections from three network units 11–13 in the preceding layer with the states ($n_1$, $n_2$, $n_3$), and each of these input connections have the strength ($q_1$, $q_2$, $q_3$). Correspondingly, the network unit 10 has three output connections with three network units 14–16 in the subsequent layer, and these network units 14–16 have the states ($\underline{n}_1$, $\underline{n}_2$, $\underline{n}_3$), and the connections to these have the strengths ($\underline{q}_1$, $\underline{q}_2$, $\underline{q}_3$). Thus, the network unit receives a signal:

$$\overline{q}_1(t)\overline{n}_1(t)+\overline{q}_2(t)\overline{n}_2(t)+\overline{q}_3(t)\overline{n}_3(t),$$

and if this expression is greater than the threshold value T(t), the state of the unit will be $n(t+\Delta t)=1$, and a pulse is transmitted. Otherwise, $n(t+\Delta t)=0$. If more than one network unit in the output layer fires, then the threshold value increases by a size $\delta$, which means that the threshold value may be expressed by:

$$T(t+\Delta t)=T(t)+\delta.$$

If no network units in the output layer fires, then the threshold value decreases by a corresponding size, and a corresponding expression may be set up. If precisely one network unit in the output layer fires, the threshold value will not be changed, and the following expression of the threshold value t may be set up:

$$T(t+\Delta t)=T(t).$$

The strengths $q_1$, $q_2$, and $q_3$ are updated according to the preferred embodiment of the invention in the following manner:

$$q_1 \rightarrow \tilde{q}_1 = q_1(t)+r(t)f(q_1(t))n(t)\underline{n}_1(t+\Delta t).$$

It is noted that r(t)f(q(t)) is just included in the adjustment of the strength of a connection when the two neurons, which the connection connects, fire successively so that n(t) and $\underline{n}_1(t+\Delta t)$ both assume the value 1.

Similar expressions may be set up for $q_2$ and $q_3$, and the function f(q) is here selected as a positive function which assumes the value 0 at the extremes of the range, and in this case f(q) may assume the value q(1−q). Further, noise in the system must also be taken into consideration.

The strength values are fixed subsequently, so that the sum of strengths from a neuron assumes the value 1. Then the strength may be expressed by:

$$q_1(t+\Delta t) = \tilde{q}_1/(\tilde{q}_1 + \tilde{q}_2 + \tilde{q}_3).$$

Similar expressions may be set up for the strengths $q_2$ and $q_3$. In the preferred embodiment the feedback value r(t) has one of two values at any time, and this value may either be expressed as $r=r_+>0$ or $r=r_-<0$ for a positive feedback and a negative feedback, respectively. If no output unit fires, the value is $r=r_+$. However, this is optional.

Figure 3:
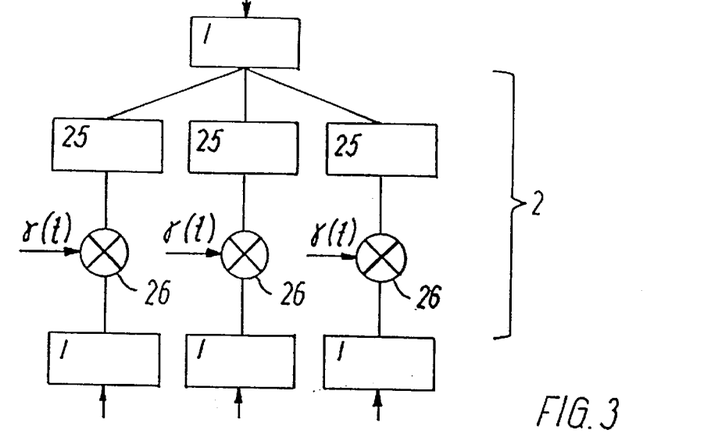
FIG. 3 is a schematic view of the coupling between the neurons of the network.

FIG. 3 shows a functional diagram of the coupling between the neurons in two network layers. A network unit 1 receives a signal on the input which is the sum of the input signals from three network units in the preceding layer. In a preferred embodiment, a network unit will be a flip-flop manufactured by IC technology.

Figure 4A:
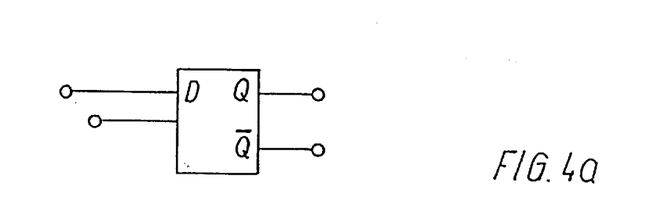
FIGS. 4*a–d* are schematic views of interesting details of the control principles in connection with the preferred embodiment of a performing network according to the invention.

FIG. 4a shows a D-flip-flop, where the output signal on the Q output follows the input signal on the D input in the follownng manner: $Q_{n+1}=D_n$. The threshold value of the network unit is incorporated by subtracting from the input signal $V_{IN}$ a threshold value voltage corresponding to the threshold value VTh concerned and adding to said input signal a bias corresponding to the threshold value voltage $V_{flip-flop}$ of the flip-flop. This gives $V_D=V_{IN}-V_{th}+V_{flip-flop}$. If $V_D$ is greater than $V_{flip-flop}$, the flip-flop recognizes the input signal as being a 1 (D=1), and a corresponding 1 is applied on the output Q. If, on the other hand, $V_D$ is smaller than $V_{flip-flop}$, the flip-flop recognizes the input signal as being a 0. Correspondingly, a 0 is applied on the output.

Figure 4B:
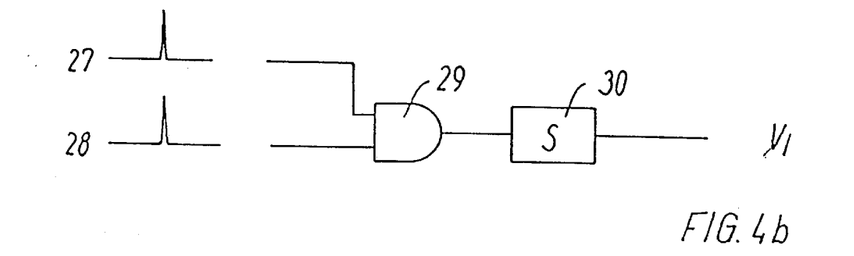

In a preferred embodiment, the output signal from the flip-flop is a delta voltage or a voltage pulse. The strength of a connection between two neurons or network units is adjusted as follows. The output signals 27, 28 of the two neurons (see FIG. 4b) are passed to a logic AND gate 29, and the signal from this is integrated in an integrator 30, which may e.g. be an operation amplifier having an integrated feedback. The signal from the integrator 30 is used for adjusting the strength of the connection.

The actual strength adjustment takes place in the connection strength regulator 25, which is shown in FIG. 3. The actual connection strength regulator 25 is shown in detail in FIG. 4c, and it is the input V1 that receives the strength regulating signal from the integrator 30.

Figure 4C:
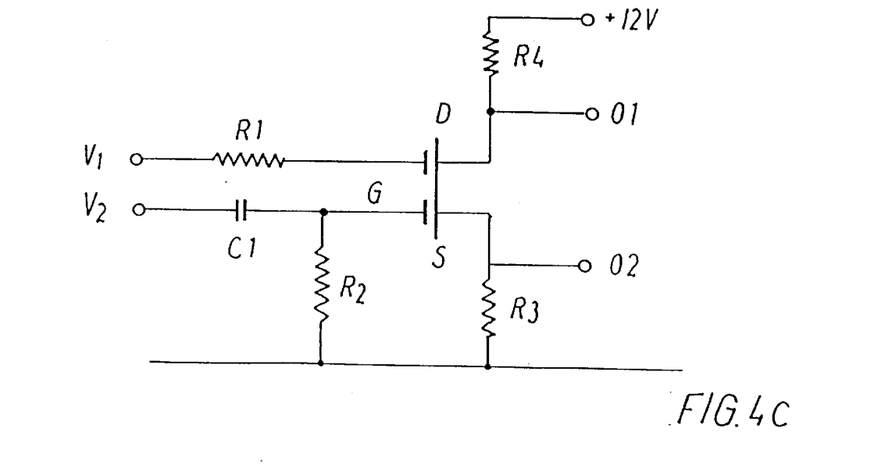

The strength regulating element here consists of a dual gate MOSFET transistor. The gain changing, slowly varying input is passed to the gate electrode of the transistor through a resistor R1. The firing signal is likewise passed to the gate electrode of the transistor in which DC components, if any, are removed by a decoupling capacitor C1. The resistor R2 is adjusted together with the resistor R1, R3 and R4 to provide suitable working conditions for the transistor. The output 01 and 02 are inverted and non-inverted, respectively. The signal on the output 02 corresponds to the signal on the input V2, but with a changed strength or amplitude.

The signal on 02 is passed from the connection strength regulator 25 to a multiplier 26 shown in FIG. 3. The firing signal is multiplied here with the feedback signal r(t), and it is worth noting that the AND gate 29 ensures that only connections between firing neurons are strengthened, as long as the network works successfully. The output from the multiplier 26 is coupled to a network unit 1 in the next layer of network units.

Figure 4D:
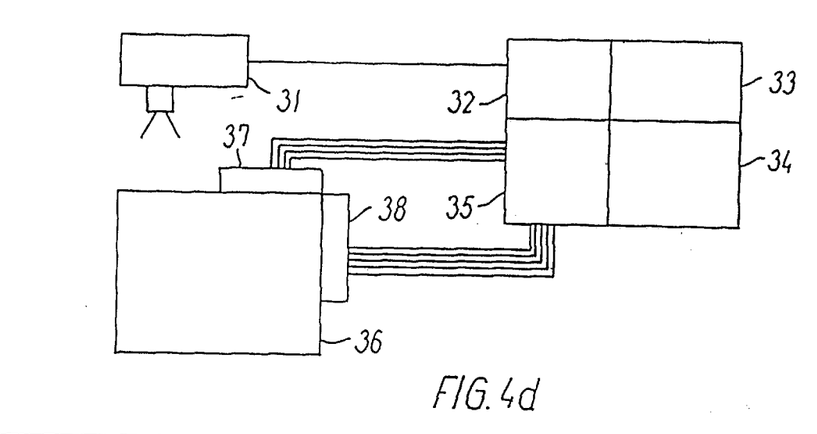

It is shown in FIG. 4d how the feedback signal r(t) is generated. The actual neural network 34 forms part of a computing unit, which moreover has an input/output unit 35 which is connected via respective interfaces 37, 38 to the external system. The interface 37 generates input parameters for the neural network, while the interface 38 controls the external system in response to the output of the network. A sensing unit 31 monitors the external system, and this sensing unit 31 may e.g. be an optical sensing unit that supplies a signal to the calculating unit. If the neural network tries to minimize the distance to the movement of a given object, the sensing unit 31 may supply a signal which represents the distance concerned. This signal is applied to a central unit 32 which compares this signal to a previously measured value of the distance, and this value is obtained from a storage 33. If this distance has been made smaller, the central unit 32 supplies a positive feedback to the neural network 34, and the feedback value concerned is likewise obtained from the storage 33. If, on the other hand, the distance has increased, a negative feedback signal is supplied to the neural network 34.

Figure 5:
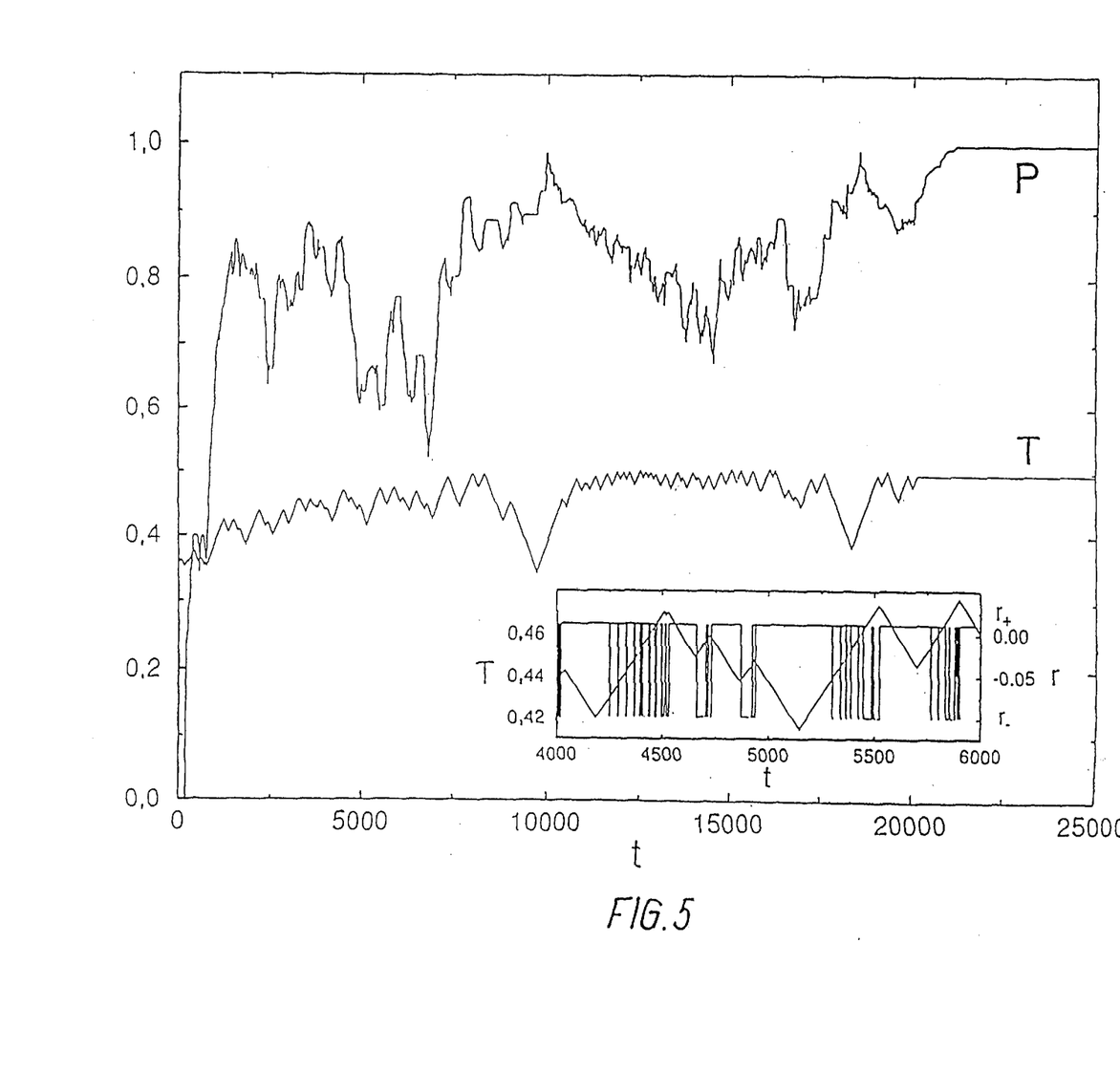
FIG. 5 shows the efficiency of a performing network according to the invention in connection with a first examples of application.

In connection with a first example of application (FIG. 5) the network is used for choosing a randomly selected activity among many, said activity being considered desirable. The network is constructed as a matrix having 64×64 network elements, and there are thus 64 outputs. If the network selects the correct action, a positive feedback is applied to the network, and the positive feedback may be $r=r_+=0.01$. If the network makes a wrong selection, the feedback will correspondingly be negative, and it may be $r=r_-=-0.1$. The performance P of the network is the part of the active actions of the network which is desired. FIG. 5 shows how the performance P of the network, which has been averaged over 1000 time intervals, as well as the threshold value T changes with time. It will be seen that the variation of the threshold value is confined between about 0.35 and 0.50. It is also noted that the performance P increases rapidly from 0 to about 0.8, and the value of P fluctuates until it reaches 1.

Figure 6:
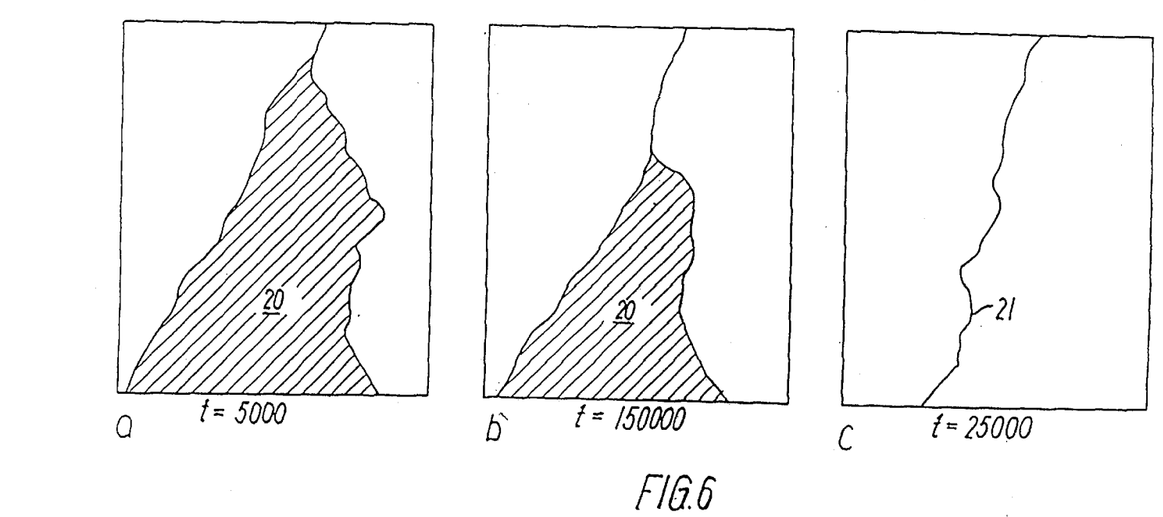
FIGS. 6*a–c* illustrate the activity of the network.

FIG. 6 shows how the average activity slowly narrows. The activity has been collected over 1000 time intervals and is concentrated within a range 20, which is slowly narrowed down to a single path 21. The neurons of the network will then form a pattern of firing neurons until either the input signal or the feedback signal changes.

Inset in FIG. 5 is a section of the temporal fluctuations in the feedback signal r and the threshold value T. The signal with more than 25000 time intervals was divided into 50 segments having 1024 intervals each (i.e. with 50% overlap), and a standard Parsen window was used for obtaining the power spectrum from these segments. Quantitatively, it will be seen that the power spectrum S(f) of the fluctuating reaction signal (feedback signal) exhibits a 1/f relation over a wide temporal range: $S(f)=constant\ f^{-\alpha}$, where α is approximately equal to 1.1.

Figure 7:
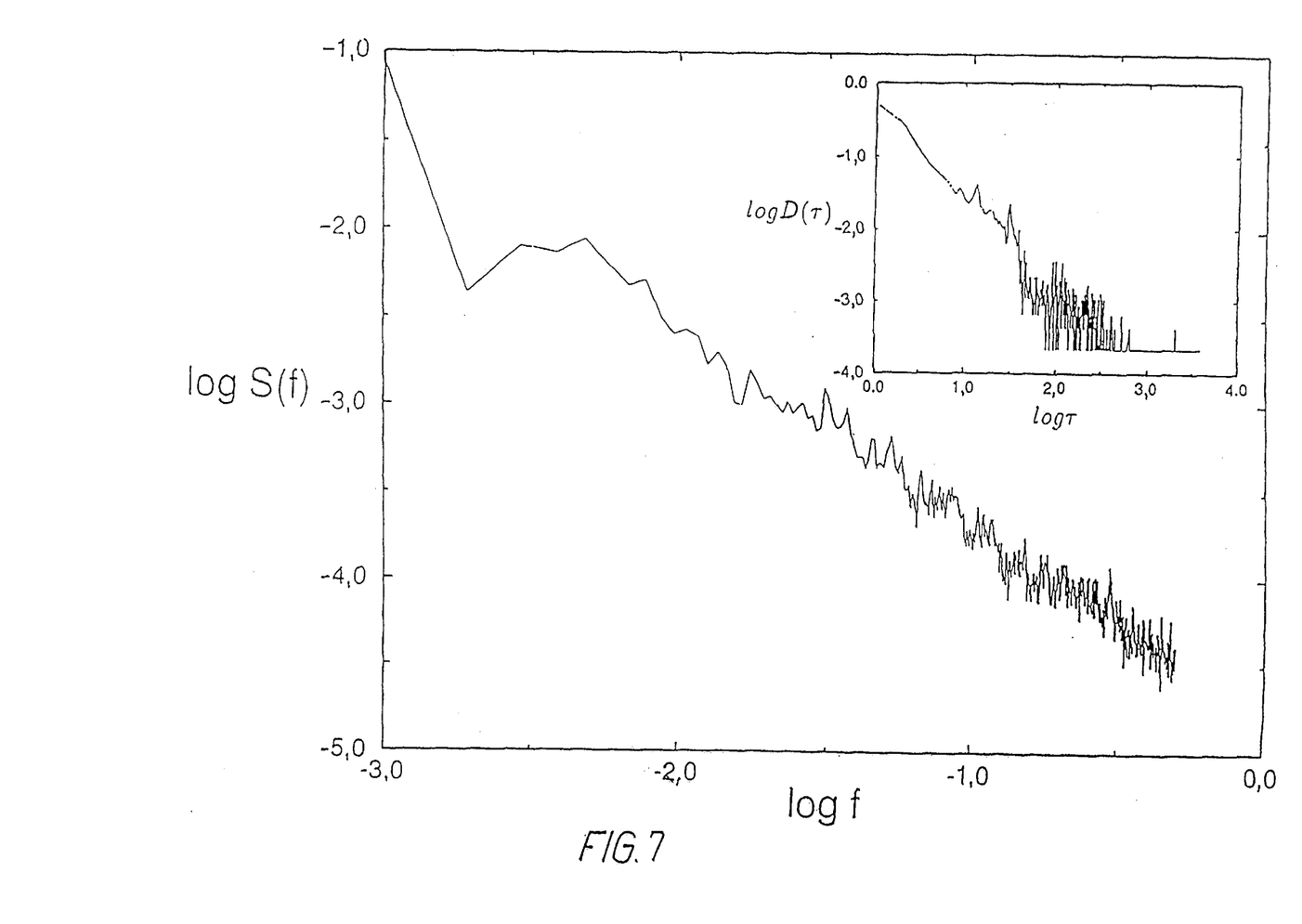
FIG. 7 illustrates the power spectrum of the network shown in FIG. 5.

Inset in FIG. 7, the distribution D(τ) is determined on the basis of five independent runs of the time intervals τ, in which r is constant ($r=r_+$ or $r=r_-$). In this case, this distribution may be expressed by $$D(\tau) = constant\ \tau^{-1.2}.$$

These graphs show that the adaptive performance in the process of learning leads to behavioural changes on a great variety of lapses of time.

In connection with the next example of application the network is caused to find and follow a movable target, which is first assumed to move along a straigth line. In this case the network is formed by network units arranged in a 16×16 matrix, in which each unit in the output layer is associated with a motion of the sighting point in a predetermined direction and with a given size. The adjacent unit may thus be related to various motions. If several units in the output layer fire simultaneously, the motion is taken as the weighted average value. If the sighting point moves away from the object, the feedback will be negative, otherwise the feedback will be positive.

Figure 8:
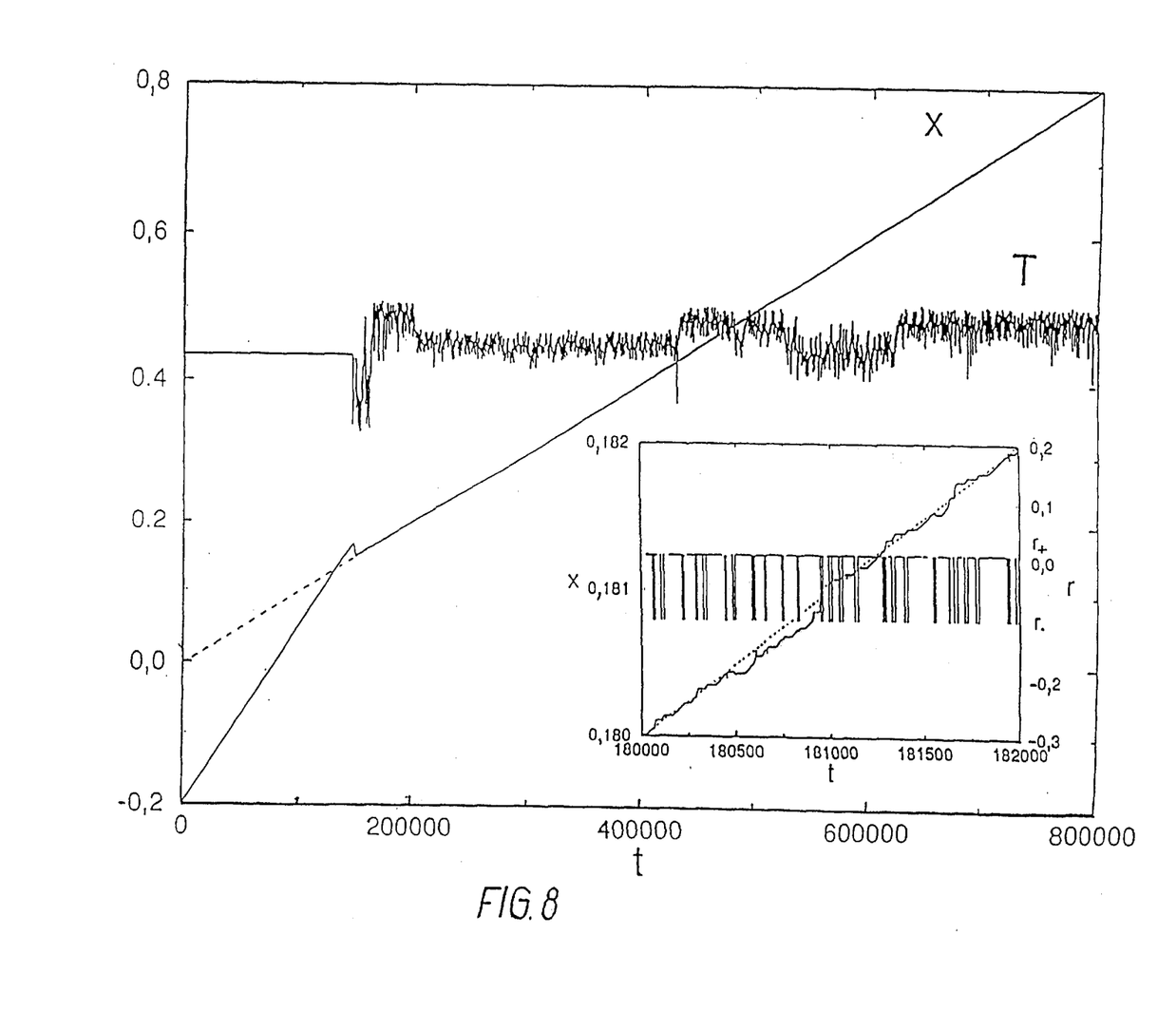
FIGS. 8 and 9 show the efficiency of the performing network according to the invention in connection with a second and a third examples of application.

FIG. 8 shows the linear motion of the object in dashed line, while the sighting point is marked by a solid line, and this coincides with the motion of the object after a short sequence. The variations in the threshold value are likewise shown. The inset image shows how the sighting follows the object, and how the feedback signal reacts during this sequence.

Figure 9:
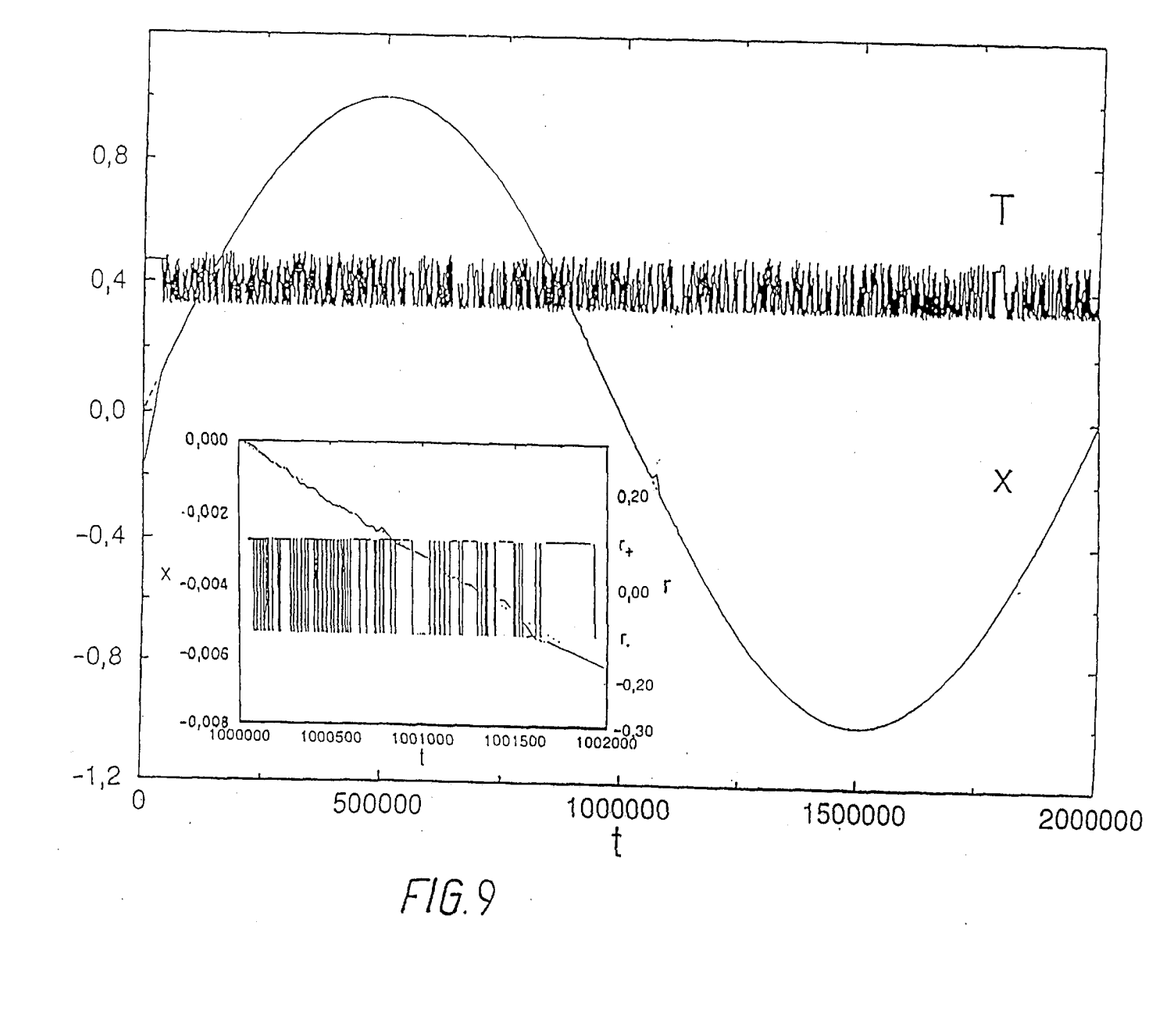

FIG. 9 shows the same case, but here the objects move along a sine curve. Here, too, the sighting point relatively rapidly captures the object and follows it. Here, too, the feedback signal is shown in an inset image, and both the movement of the object and the movement of the sighting point may be followed. It is important to the invention that the feedback of the system does not lock, but constantly changes between negative and positive. It is primarily this that gives the performing network its adaptability and performance.

Figure 10:
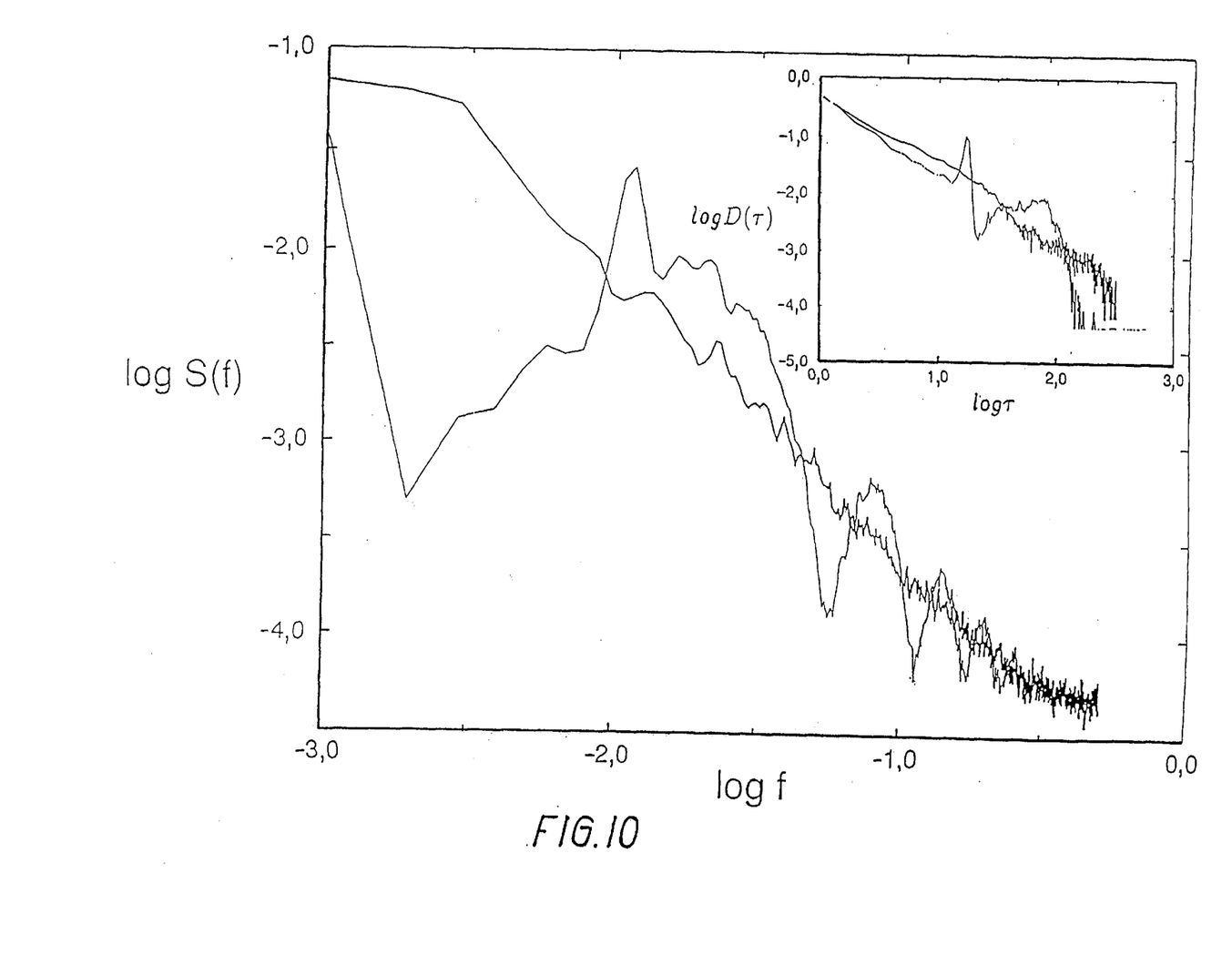
FIG. 10 shows the power spectrum of the network whose performance is shown in FIGS. 8 and 9.

FIG. 10 shows the power spectrum of the applications shown in FIGS. 8 and 9, and it will be noted that peak values occur in the power spectrum $S(f)$ and in the distribution $D(\tau)$, indicating that some time intervals occur particularly frequently during the performing process. According to the example of application with the linear motion of the object there are two peak values in the distribution $D(\tau)$, a narrow peak being present at $\tau_1=15$ and a wide peak around $\tau_2=80$. A separation of the distribution $D(\tau)$ in two distributions $D_-(\tau)$ and $D_+(\tau)$ of a negative feedback and a positive feedback, respectively, shows that $\tau_1$ is related to a negative feedback, and $\tau_2$ is related to a positive feedback. This indicates that peaks may occur in the distribution when the network is in the learning mode. Although just relatively simple examples of application have been discussed above, it will be clear to a skilled person that the network, although it has not been specially adapted to the given tasks, has been able to adapt itself on the basis of the feedback signal, which regulates the control parameters of the network units. The performance P of the network has increased to a satisfactory level. Although it is still worthwhile subjecting neural networks to a learning process, the parameters being adjusted at the satisfactory starting level, the performance network of the invention is unique in that it is capable of adapting itself to changes in the surroundings. It will here be possible to compensate for ageing of the process system or to compensate for the possible circumstance that one or more input parameters for the network are vitiated by errors.

We claim:

1. A neural network system comprising;

an input layer arrangement of a plurality of network neurons receiving an input signal from an external system, a plurality of intermediate layers of said network neurons, and an output layer of said network neurons supplying an output signal to said external system, wherein each neuron in an intermediate layer and the output layer is connected to a predetermined number of neurons in the preceding layer, each neuron in the input layer and an intermediate layer being connected to said predetermined number of neurons in the subsequent layer, each neuron of an intermediate layer or the output layer receiving a combined input signal which is the sum of the output signals of the neurons in the preceding layer, wherein each neuron is adapted to fire or emit an electric pulse, whereby if one of the input signal and the combined input signal of a neuron exceeds a given controllable threshold $T(t)$, the state $n(t)$ of said neuron being "0" when no pulse is emitted, and being "1" when a pulse is emitted, so that if the input signal or the combined input signal of said neuron is greater than the threshold value $T(t)$, the state of said neuron will be $n(t+\Delta t)=1$, whereby the input connections to a neuron in one of an intermediate layer and the output layer have adaptable strengths $\bar{q}_1, \bar{q}_2, \ldots \bar{q}_k$ from k neurons in the preceding layer with states $\bar{n}_1, \bar{n}_2, \ldots \bar{n}_k$, so that a combined input signal is $\bar{q}_1(t)\bar{n}_1(t)+\bar{q}_2(t)\bar{n}_2(t)+\ldots+\bar{q}_k(t)\bar{n}_k(t)$, and whereby the output connections from a neuron in the input layer and an intermediate layer have adaptable strengths $q_1, q_2, \ldots q_k$ to k neurons in the subsequent layer with states, $\underline{n}_1, \underline{n}_2, \ldots \underline{n}_k$, means being provided for evaluating the response of the network, wherein the number of firings from the output layer determines the threshold value so that if the number of firings exceeds a certain value the threshold value signal increases, if the number of firings has said certain value the threshold value signal will not be changed, and if the number of firings is below said certain value, the threshold value signal is reduced, and wherein the strength of a signal $q_1$ of an output connection of a neuron with state n to a neuron with a state $n_1$ is updated in accordance with $q_i-q_1=q_i(t)+r(t)\underline{f}(q_i(t))n(t)\underline{n}_i(t+\Delta t)$, where $r(t)$ is a feedback signal, and $n(t)$ and $n_1(t+\Delta t)$ are state signals which are responsive to the feedback signal applied to the network from said external system being controlled by the neural network so that if $n(t)$ and $n_1(t+\Delta t)$ both assume the value 1 then $r(t)\underline{f}(q(t))$ is included in the adjustment of the strength of a connection, and wherein changes to at least one of said threshold value signal and said adaptable strength of said connection in response to feedback from said external system permits said neural network system to adapt to at least one of changes in operating conditions and new conditions of said external system.

2. A neural network according to claim 1, wherein the signals on the output of the network neurons are formed by short pulses or firings, and the height of a transferred pulse depends on the strength level associated with the firing neurons.

3. A neural network according to claims 2, wherein the relative change in the threshold value over a period corresponding to the response time of the network is small.

4. A neural network according to claim 1, wherein the relative change in the threshold value over a period corresponding to the response time of the network is small.

5. A method of optimizing a neural network having dynamically varying operating conditions, said method comprising:

arranging a plurality of neurons in an input layer receiving an input signal from an external system, a plurality of intermediate layers, and an output layer supplying an output signal to said external system, connecting each neuron in an intermediate layer and the output layer to a predetermined number of neurons in the preceding layer, connecting each neuron in the input layer and an intermediate layer to said predetermined number of neurons in the subsequent layer, receiving by each neuron of one of an intermediate layer and the output layer a combined input signal which is the sum of the output signals of the neurons in the preceding layer, adapting by each neuron to fire or emit an electric pulse, setting the state n(t) of said neuron to "0" when no pulse is emitted and to "1" when a pulse is emitted if one of the input signal and the combined input signal of a neuron exceeds a given controllable threshold T(t) so that if one of the input signal and the combined input signal is greater than the threshold value T(t) the state of said neuron will be n(t+Δt)=1, providing the input connections to a neuron in one of an intermediate layer and the output layer with adaptable strengths $\bar{q}_1, \bar{q}_2, \ldots \bar{q}_k$ from k neurons in the preceding layer with states $\bar{n}_1, \bar{n}_2, \ldots \bar{n}_k$ so that a combined input signal is $\bar{q}_1,(t)\bar{n}_1(t)+\bar{q}_2(t)\bar{n}_2(t)+\ldots+\bar{q}_k(t)\bar{n}_k(t)$, providing the output connections from a neuron in the input layer and an intermediate layer with adaptable strengths $q_1, q_2, \ldots q_k$ to k neurons in the subsequent layer with states $\underline{n}_1, \underline{n}_2, \ldots \underline{n}_k$, evaluating the response of the network wherein the number of firings from the output layer is used for determining the threshold value so that when the number of firings exceeds a certain value the threshold value increases, leaving the threshold value signal unchanged if the number of firings has said certain value, reducing the threshold value when the number of firings is below said certain value, updating the strength of a signal $q_i$ of an output connection of a neuron with state n to a neuron with a state $\underline{n}_i$ in accordance with $q_i - q_i = q_i(t) + r(t)\underline{f}(q_i(t))n(t)\underline{n}_i(t+\Delta t)$, where r(t) is a feedback signal, and n(t) and $\underline{n}_i(t+\Delta t)$ are state signals which are responsive to the feedback signal applied to the network from said external system being controlled by the neural network so that if n(t) and $\underline{n}_i(t+\Delta t)$ both assume the value 1 then $r(t)\underline{f}(q_i(t))$ is included in the adjustment of the strength of a connection, and adapting said neural network to at least one of changing conditions and new conditions in said external system by changes to at least one of said threshold value signal and said adaptable strengths of said connections.

6. A method by a neural network for self adapting to changing operating conditions of an external system coupled to said neural network, said method includes providing a neural network having a plurality of neurons arranged on an input layer receiving an input signal from the external system, a plurality of intermediate layers, and an output layer supplying an input signal to the external system, connecting such neuron in an intermediate layer and the output layer to a predetermined number of neurons in the preceding layer, connecting each neuron in the input layer and an intermediate layer to said predetermined number of neurons in the subsequent layer, receiving by each neuron in one of an intermediate layer or the output layer a combined input signal which is the sum of the output signals of the neurons in the preceding layer, emitting by each one of said neurons a pulse signal in response to a received signal which exceeds a threshold value for said one of said neurons, and evaluating the response of the network, the improvements comprising the steps of:

determining the threshold value from the number of firings from the output layer, increasing the threshold value signal if the number of firings exceeds a certain value, leaving the threshold value signal unchanged if the number of firings equals said certain value, reducing the threshold value signal if the number of firings is below said certain value, updating the strength of a signal $q_i$ of an output connection of a neuron with state n to a neuron with a state $\underline{n}_i$ in accordance with $q_i \rightarrow q_i = q_i(t) + r(t)\underline{f}(q_i(t))n(t)\underline{n}_i(t+\Delta t)$, with r(t) being a feedback signal and said n(t) and $\underline{n}_i(t+\Delta t)$ being state signals, said state signals being responsive to the feedback signal applied to the network from said external system being controlled by the neural network so that if n(t) and $\underline{n}_i(t+\Delta t)$ both assume the value 1 then $r(t)\underline{f}(q_i(t))$ is included in the adjustment of the strength of a connection, and adapting by said neural network to said changing operating conditions of said external system by at least one of said steps of reducing and updating.

7. The method according to claim 6, wherein the threshold value comprises changes in the threshold value that are maintained relative to a period corresponding to a response time of the neural network.

8. The method according to claim 6, wherein a feedback input to the neural network is a positive input indicative of a desired network output by the neural network, and the feedback input is a negative input indicative of an undesired network output by the neural network.

9. A method of optimizing a neural network having neurons with a connection from each one of said neurons to at least one other of said neurons, said method comprising:

adapting each one of said neurons to emit a pulse signal on its said connection in response to receiving a pulse signal form at least one other of said neurons;

associating each one of said neurons with control parameters in the form of a threshold value and a strength level for said connection from said each one of said neurons;

emitting said pulse signal by each one of said neurons based on the associated said threshold value and said strength level for said connection from said each one of said neurons;

providing a network input to said neural network from an external system and at least one of said neurons emitting said pulse signal in response to said network input from said external system;

providing a network output with at least one of said neurons emitting said pulse signal in response to said neural network processing said network input from said external system; and updating at least one of said threshold value and said strength level of said connection for at least one of said neurons in response to said network output by said neural network wherein updating the strength of a signal $q_i$ of a connection for an output of a neuron with state n to a neuron with a state $\underline{n}_i$ in accordance with $q_i - q_i = q_i(t) + r(t)\underline{f}(q_i(t))n(t)\underline{n}_i(t+\Delta t)$, r(t) being a feedback signal, and said n(t) and $\underline{n}_i(t+\Delta t)$ being state signals, said state signals being responsive to the feedback signal applied to the network from said external system being controlled by the neural network so that if n(t) and $\underline{n}_i(t+\Delta t)$ both assume the value 1, then $r(t)\underline{f}(q_i(t))$ is included in the adjustment of the strength of a connection, said step of updating improves optimization of said neural network to perform in response to said external system.

10. The method of claim 9, wherein said step of modifying comprises making adjustments to one of said threshold value and said strength level in said connection based on how many of said neurons selected to provide said network output emit said pulse signal.

11. The method according to claim 9, wherein said step of modifying comprises increasing said threshold value if a number of said neurons providing said network output is greater than a predetermined number, and reducing the threshold value if the number of said neurons providing said network output is less than said predetermined number.

12. The method according to claim 11, wherein said threshold value comprises changes in said threshold value that are maintained relative to a period corresponding to a response time of said neural network.

13. The method according to claim 9, wherein said step of modifying comprises determining said strength level for said connection from each one of said neurons based on how many of said pulse signal are supplied by said network output.

14. The method according to claim 9, wherein said step of emitting said pulse signal by each one of said neurons comprises a first group of said neurons in an input layer of said neural network transmitting to a second group of said neurons in an intermediate layer of said neural network, and said second group of said neurons in said intermediate layer transmitting to a third group of said neurons in an output layer of said neural network.

15. The method according to claim 9, wherein said step of modifying comprises increasing said strength level for each said connection between those of said neurons that influence a desired response from said network output and decreasing said strength level for each said connection between those of said neurons that influence an undesired response from said network output.

16. The method according to claim 9, wherein the step of modifying comprises receiving into a group of said neurons a feedback input indicative of whether said network output by said neural network is at least one of a desired and an undesired output.

* * * * *